Figure 1:
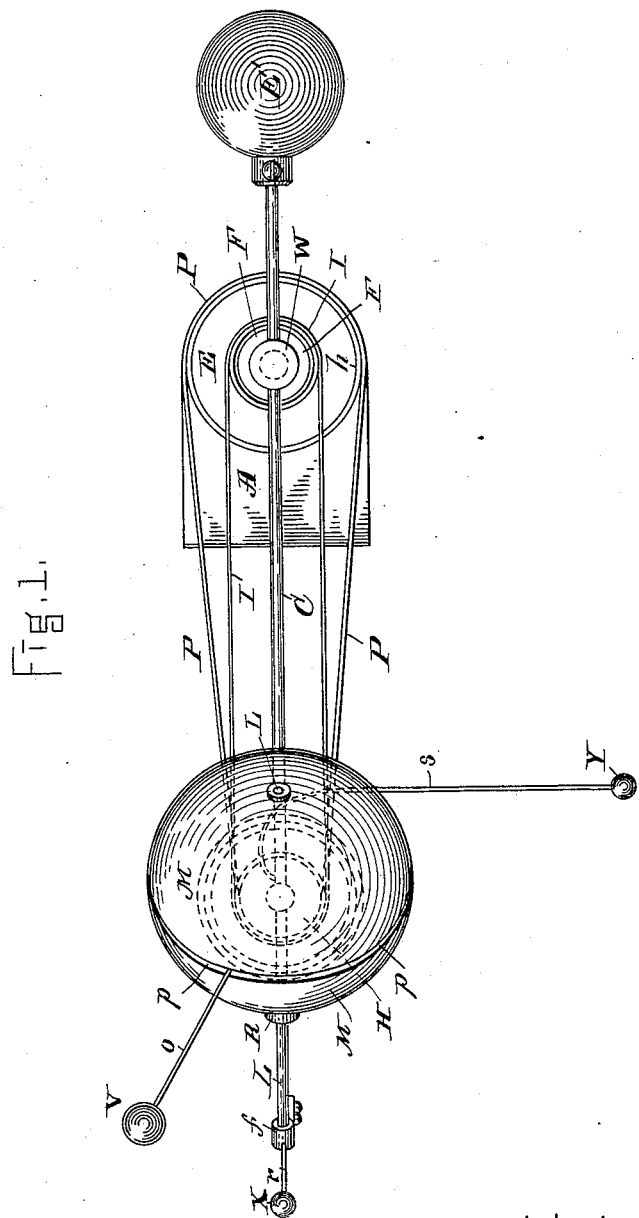

(No Model.) 2 Sheets—Sheet 1.

G. R. MOORE.
TELLURIAN.

No. 452,413. Patented May 19, 1891.

WITNESSES.
R. Henry Marsh.
Harry W. Aiken.

INVENTOR.
George R. Moore
By P. E. Teschemacher
Atty.

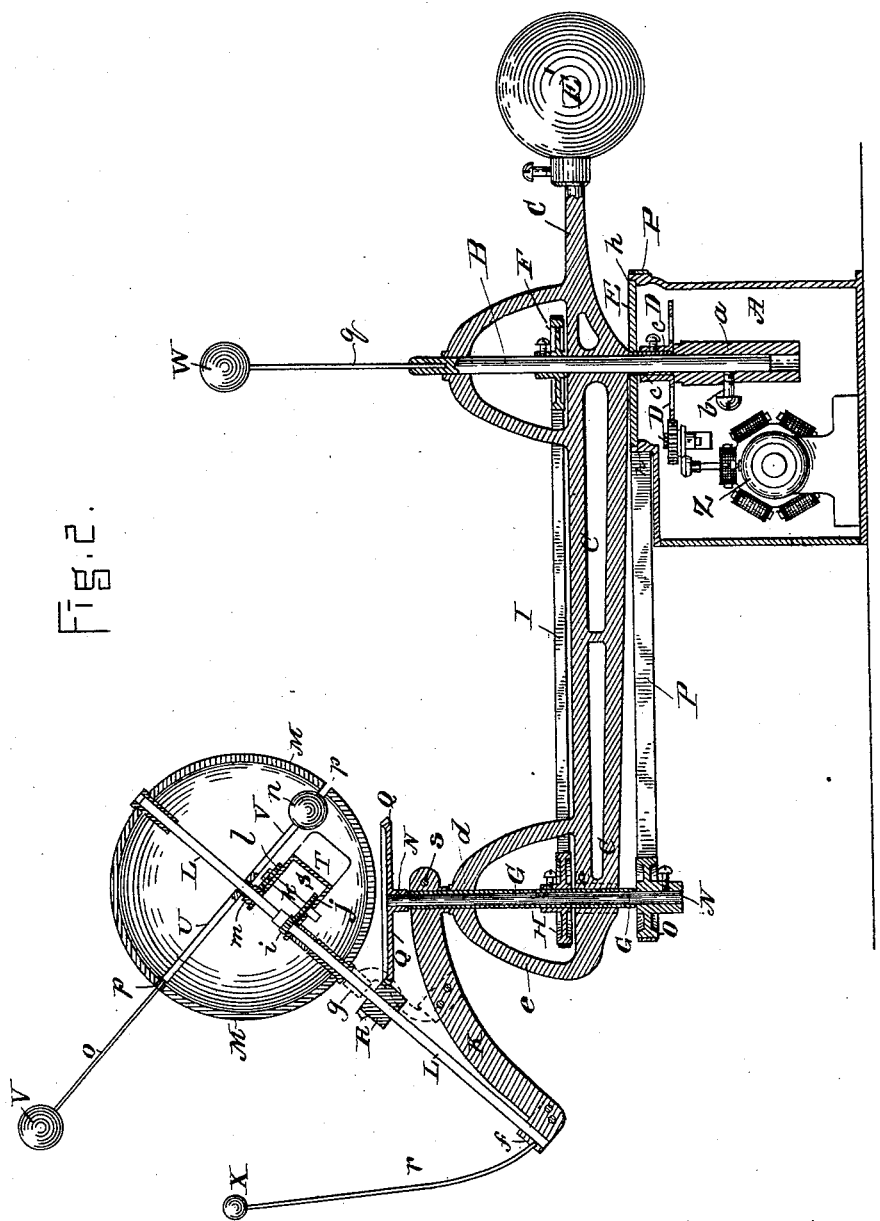

UNITED STATES PATENT OFFICE.

GEORGE R. MOORE, OF WESTFORD, MASSACHUSETTS, ASSIGNOR OF ONE-HALF TO EDWARD A. MOORE, OF SAME PLACE.

TELLURIAN.

SPECIFICATION forming part of Letters Patent No. 452,413, dated May 19, 1891.

Application filed January 13, 1891. Serial No. 377,659. (No model.)

*To all whom it may concern:*

Be it known that I, GEORGE R. MOORE, a citizen of the United States, residing at Westford, in the county of Middlesex and State of Massachusetts, have invented certain new and useful Improvements in Tellurians; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a plan view, and Fig. 2 a vertical and longitudinal section, of an apparatus embodying my invention, the nature of which is defined in the claims hereinafter presented.

Similar letters refer to similar parts throughout both views.

In the drawings, A denotes a chambered base or case supplied with a bearing $a$, in which is supported an upright stationary shaft B, fixed in position in said bearing by a set-screw $b$.

C is a frame applied to the shaft B and adapted to swing horizontally thereon, and having a sleeve $c$ projecting below said frame and bearing at its lower end on the top of the bearing $a$.

D is a gear fixed to said sleeve, and E is a disk closing the top of the chambered base.

F is a pulley secured to the shaft B.

E′ represents an adjustable weight applied to the shorter arm of the frame C to counterbalance the longer arm of said frame and also the appliances supported thereby.

Supported in bearings $d$ and $e$ near the outer end of the longer arm of the frame is a tubular shaft G, having a pulley H secured thereto, around which and the pulley F a band I runs. Near to the top of the shaft G a curved arm K is secured, said arm provided with bearings $f$ and $g$ for an inclined shaft L, to which is applied a globe M, representing the earth. Within the tubular shaft G is a shaft N, provided at its lower end with a pulley O, about which and the circular top $h$ of the case A a band P passes. To the upper end of said shaft N a bevel-gear Q is fixed, said gear engaging a bevel-pinion R, secured to the inclined shaft L. Within the globe is a frame S, suspended from the said shaft L, said frame provided with a weight T. A pinion $i$, fixed to the shaft L, engages a gear $j$, fixed to a shaft $k$, supported in the frame S parallel to the shaft L and provided on its upper end with a gear $l$, which engages a sleeve-pinion $m$, adapted to turn on the shaft L, said pinion $m$ being fixed to an arm U, having a weight $n$ at one end and a rod $o$ at the other end, which supports a sphere V, representing the moon. The globe M is divided into two hollow semi-spheres, which are applied to the shaft L, so that there shall be a space $p$ between them for the rod $o$ to travel in when illustrating the motion of the moon V around the earth. A rod $q$, extending upward from the shaft B, supports at its top a sphere W, representing the sun.

X and Y are balls supported by wires $r$ $s$, secured to the machine, and represent fixed planets.

Within the chambered base is arranged an electric motor Z, by which power is transmitted to the gear D, whereby the frame C is caused to turn in a horizontal plane, giving to the globe M a movement representing the motion of our earth around the sun. The axis of the earth-globe M is kept parallel to its former position in its rotation around the sun-globe W by the pulleys F and H, band I, tubular shaft G, and curved arm K, fixed to the said shaft G, said arm K sustaining the inclined shaft L, the axis of which represents the axis of the earth. The motion of the moon-globe V around the earth-globe M is produced by the circular top $h$ of the case A, the band P, pulley O, vertical shaft N, gear Q, and pinions R and $i$, inclined shaft L, gears $j$ and $l$, shaft $k$, and pinion $m$, the latter fixed to the arm U, supporting the rod $o$, to which the moon-globe V is fixed. The motion of the globe M about its own axis is produced by the part $h$ of the case A, the band P, pulley O, vertical shaft N, gear Q, pinion R, and inclined shaft L.

What I claim is—

1. A tellurian consisting of a chambered base provided with a circular band-bearing $h$ and a shaft-bearing $a$, an upright stationary shaft fixed to said base, said shaft provided with a pulley F, a frame C, supported by said shaft and the chambered base, said frame having a sleeve c extending within the base, a gear D, fixed to said sleeve, a sun-globe W, supported from the shaft B, a tubular shaft G, provided with pulley H, a shaft N, having a pulley O, bands I and P, an arm K, provided with bearings, an inclined shaft L, supported in said bearings, a globe M, representing the earth, made in halves, supported on shaft L and arranged with a space between them, pinions R and $i$, fixed to shaft L, weighted frame S, gears $j$ and $l$, shaft $k$, pinion $m$, fixed to weighted arm U, turning loosely on shaft L, said arm-supporting-rod provided with moon-globe V, combined with motor Z, as and for the purpose explained.

2. The combination for producing the rotation of the moon-globe V around the earth-globe M, consisting of the circular part $h$ of the base A, the band P, pulley O, vertical shaft N, gear Q, inclined shaft L, pinions R and $i$, fixed to said shaft, gears $j$ and $l$, shaft $k$, supporting said gears, weighted frame S, pinion $m$, turning loosely on shaft L, the arm U, to which said pinion $m$ is fixed, the frame C, the gear D, fixed thereto, and the motor Z, all arranged, supported, and to operate essentially as described and represented.

In testimony whereof I affix my signature in presence of two witnesses.

GEORGE R. MOORE.

Witnesses:
P. E. TESCHEMACHER,
HARRY W. AIKEN.